US010269028B2

United States Patent
Vratskides et al.

(10) Patent No.: US 10,269,028 B2
(45) Date of Patent: *Apr. 23, 2019

(54) MESSAGE OPTIMIZATION

(71) Applicant: Persado Intellectual Property Limited, London (GB)

(72) Inventors: Alexios Vratskides, London (GB); Ori Einstein, Ealing (GB); Guy Stephane Krief, London (GB); Assaf Baciu, London (GB)

(73) Assignee: PERSADO INTELLECTUAL PROPERTY LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/653,974

(22) Filed: Jul. 19, 2017

(65) Prior Publication Data

US 2017/0316430 A1    Nov. 2, 2017

Related U.S. Application Data

(63) Continuation of application No. 13/517,032, filed as application No. PCT/EP2010/006920 on Nov. 12, 2010, now Pat. No. 9,741,073.

(30) Foreign Application Priority Data

Dec. 23, 2009 (GB) .................................. 0922608.5

(51) Int. Cl.
*G06F 17/27*     (2006.01)
*G06Q 30/02*     (2012.01)
(Continued)

(52) U.S. Cl.
CPC ............ *G06Q 30/02* (2013.01); *G06F 17/20* (2013.01); *G06F 17/21* (2013.01); *G06F 17/211* (2013.01);
(Continued)

(58) Field of Classification Search
CPC ..... G10L 15/22; G10L 15/285; G06F 17/274; G06F 17/20; G06F 17/21; G06F 17/211;
(Continued)

(56) References Cited

U.S. PATENT DOCUMENTS 4,930,077 A    5/1990  Fan
5,173,854 A   12/1992  Kaufman et al.
(Continued)

FOREIGN PATENT DOCUMENTS

WO    2001048666    7/2001
WO    2011076318    6/2011

OTHER PUBLICATIONS

International Search Report and Written Opinion PCT/EP2010/006920, 10 pages, dated Feb. 7, 2011.
(Continued)

*Primary Examiner* — Vijay B Chawan
(74) *Attorney, Agent, or Firm* — Lessani Law Group, PC

(57) ABSTRACT

The present invention provides a system and method for optimizing a message. Components of a starting message are identified, and at least one rule is applied for modifying at least one message component to create at least one variation of the starting message. Message variants are tested by sending each variant to a sample of people and measuring a response rate for each sent message variant. The measured response rates are used to create an optimal version of the message. In one embodiment, message variants may be created and tested in multiple rounds.

17 Claims, 15 Drawing Sheets

(51) Int. Cl.
*G06F 17/21* (2006.01)
*G06F 17/20* (2006.01)
*G06F 17/24* (2006.01)

(52) U.S. Cl.
CPC .............. *G06F 17/27* (2013.01); *G06F 17/24* (2013.01); *G06F 17/274* (2013.01); *G06F 17/2785* (2013.01)

(58) Field of Classification Search
CPC ...... G06F 17/24; G06F 17/27; G06F 17/2785; G06F 17/30899; G06F 17/28
USPC ............................... 704/1–10, 231, 275, 100
See application file for complete search history.

(56) References Cited

U.S. PATENT DOCUMENTS

| | | | |
|---|---|---|---|
| 5,652,828 A | 7/1997 | Silverman | |
| 6,278,967 B1 | 8/2001 | Akers et al. | |
| 6,400,996 B1 | 6/2002 | Hoffberg et al. | |
| 6,470,306 B1 | 10/2002 | Pringle et al. | |
| 6,647,383 B1 | 11/2003 | August et al. | |
| 6,687,404 B1 | 2/2004 | Hull et al. | |
| 6,760,695 B1 | 7/2004 | Kuno et al. | |
| 6,934,748 B1 | 8/2005 | Louviere et al. | |
| 6,978,239 B2 | 12/2005 | Chu et al. | |
| 7,006,881 B1 | 2/2006 | Hoffberg et al. | |
| 7,013,427 B2 | 3/2006 | Griffith | |
| 7,130,808 B1 | 10/2006 | Ranka et al. | |
| 7,133,834 B1 | 11/2006 | Abelow | |
| 7,137,126 B1* | 11/2006 | Coffman | G06F 17/30899 719/328 |
| 7,167,825 B1 | 1/2007 | Potter | |
| 7,181,438 B1 | 2/2007 | Szabo | |
| 7,302,383 B2 | 11/2007 | Valles | |
| 7,363,214 B2 | 4/2008 | Musgrove et al. | |
| 7,406,434 B1* | 7/2008 | Chang | G06Q 10/06375 705/14.1 |
| 7,493,250 B2 | 2/2009 | Hecht et al. | |
| 7,769,623 B2 | 8/2010 | Mittal et al. | |
| 7,797,699 B2 | 9/2010 | Kagi et al. | |
| 7,945,573 B1 | 5/2011 | Barnes et al. | |
| 8,260,663 B1 | 9/2012 | Ranka et al. | |
| 8,689,253 B2 | 4/2014 | Hallberg et al. | |
| 9,268,769 B1* | 2/2016 | Shalit | G06F 17/28 |
| 9,741,043 B2* | 8/2017 | Vratskides | G06Q 30/02 |
| 2002/0156688 A1 | 10/2002 | Horn et al. | |
| 2002/0174144 A1 | 11/2002 | Wolpe | |
| 2005/0027507 A1 | 2/2005 | Patrudu | |
| 2005/0039116 A1 | 2/2005 | Slack-Smith | |
| 2005/0060643 A1 | 3/2005 | Glass et al. | |
| 2005/0076003 A1 | 7/2005 | DuBose et al. | |
| 2005/0234850 A1 | 10/2005 | Buchheit et al. | |
| 2006/0155567 A1 | 7/2006 | Walker et al. | |
| 2006/0212524 A1 | 9/2006 | Wu et al. | |
| 2006/0259360 A1 | 11/2006 | Flinn et al. | |
| 2007/0033002 A1* | 2/2007 | Dymetman | G06F 17/274 704/5 |
| 2007/0055931 A1 | 3/2007 | Zaima et al. | |
| 2007/0127688 A1 | 6/2007 | Doulton | |
| 2007/0153989 A1 | 7/2007 | Howell et al. | |
| 2007/0168863 A1 | 7/2007 | Blattner et al. | |
| 2007/0233566 A1 | 10/2007 | Zlotin et al. | |
| 2007/0239444 A1 | 10/2007 | Ma | |
| 2007/0260740 A1 | 11/2007 | Guan | |
| 2007/0281286 A1 | 12/2007 | Palacios | |
| 2008/0059149 A1 | 3/2008 | Martin | |
| 2008/0109285 A1 | 5/2008 | Reuther et al. | |
| 2008/0178073 A1 | 7/2008 | Gao et al. | |
| 2008/0281627 A1 | 11/2008 | Chang et al. | |
| 2008/0300857 A1 | 12/2008 | Barbaiani et al. | |
| 2008/0313259 A1 | 12/2008 | Correa | |
| 2009/0110268 A1 | 4/2009 | Dejean et al. | |
| 2009/0150400 A1 | 6/2009 | Abu-Hakima et al. | |
| 2009/0177750 A1 | 7/2009 | Lee et al. | |
| 2009/0210899 A1 | 8/2009 | Lawrence-Apfelbaum et al. | |
| 2009/0226098 A1 | 9/2009 | Takahashi et al. | |
| 2009/0254836 A1 | 10/2009 | Bajrach | |
| 2009/0276419 A1 | 11/2009 | Jones et al. | |
| 2009/0313026 A1* | 12/2009 | Coffman | G06F 17/30899 704/275 |
| 2010/0100817 A1 | 4/2010 | Trotter | |
| 2010/0241418 A1 | 9/2010 | Maeda et al. | |
| 2010/0312769 A1 | 12/2010 | Bailey et al. | |
| 2010/0312840 A1 | 12/2010 | Chestnut et al. | |
| 2011/0040611 A1 | 2/2011 | Simmons et al. | |
| 2012/0095831 A1 | 4/2012 | Aaltonen et al. | |
| 2012/0259620 A1* | 10/2012 | Vratskides | G06Q 30/02 704/9 |
| 2013/0311269 A1* | 11/2013 | Forte | G06Q 30/0241 705/14.43 |

OTHER PUBLICATIONS

International Preliminary Report on Patentability PCT/EP2010/006920, 9 pages, dated May 15, 2012.
"Drop-Down list", Dec. 21, 2008.
Hill Associates, "Weighted and Round Robin Queuing", Jul. 14, 2007.
Katevenis, M., et al., "Weighted Round-Robin Cell Multiplexing in a General-Purpose ATM Switch Chip", Oct. 1991, IEEE Journal on Selected Areas in Communication, vol. 9, No. 8.
Lee, Jinkyu, et al., "Multiprocessor Real-Time Scheduling Considering Concurrency and Urgency", Special Issue of the Work-in-Progress (WIP) Session at the 2009 IEEE Real-Time Systems Symposium, Washington, D.C., Dec. 1-4, 2009.
Sawyer, Alan G., "Statistical Power and Effect Size in Consumer Research", in NA—Advances in Consumer Research vol. 09, eds, 1982, pp. 1-7.
"Slider (Computing)", Sep. 27, 2007.

* cited by examiner

Step 2: Parts Creation

Surprise! Are you ready for the real mobile? 500MB of internet+unlimited Vodafone+2 months free for only 3.99E/month! Just send YES to 400!

[3] [Add]

Current Selection:

| Part | Selection | |
|---|---|---|
| CTA | Just send YES to 400! | X |
| PRODUCT 2 | unlimited Vodafone live+ | X |
| PRODUCT 1 | 500MB of internet+ | X |
| PRICE | for only 3.99E/month | X |
| INTRO | Surprise! | X |

[Reset] [Save]

Step 3: Genes Creation

| | Gene | Part | Rule | Values | | |
|---|---|---|---|---|---|---|
| 1 | G1 | INTRO | can be replaced with | 2:Congrats! 3:Execute! | | ✎ |
| 2 | G2 | PRODUCT 1 | can be replaced with | 2:500MB of internet & 3:500MB of internet at 7.2Mbps + 4:0.5GB of internet + | | ✎ |
| 3 | G3 | PRODUCT 2 | can be replaced with | 2:Vodafone live unlimited +3:empty | | ✎ |
| 4 | G4 | CTA | can change its place to come before | | INTRO | |

FIG. 9

MESSAGE OPTIMIZATION

RELATED APPLICATIONS

This application is a continuation of U.S. patent application Ser. No. 13/517,032, titled "Message Optimization" filed on Jun. 18, 2012, which is a U.S. National Stage of PCT/EP2010/006920 under 35 USC 371 (filed on Nov. 12, 2010), which claims priority from United Kingdom Application 0922608.5 filed on Dec. 23, 2009. The contents of parent application Ser. No. 13/517,032 are incorporated by reference as if fully disclosed herein.

TECHNICAL FIELD

This application relates to a method of optimizing a message, a method for generating a modified message, a communications server equipment, a computer program, and a computer program product.

BACKGROUND ART

We live in a world where increasingly things get pushed to us via call to actions—these call to actions are frequently immediately actionable. Examples of such actions is clicking on sponsored links that are advertised on the right hand side of Google search results (or other search engines), responding to an SMS call to action by clicking on a WAP link on a handset or via responding through the sending of an SMS, or via calling a number. Our world is getting more and more congested with short marketing sentences that prompt consumers into action. The gratification mechanic on those actions becomes more and more immediate through the use of technology. Direct marketing agencies have long now tested the effectiveness of different calls to actions for the same marketing item, in an attempt to optimize the response rate. It is widely accepted that optimizing the way you phrase a call to action can have different effect on people. However, so far, no analytical method has been applied to actually compose the optimal way to say something. When the marketing message is only just a few words, such an analytical exercise is feasible, as alternatives are finite within a language.

DISCLOSURE OF INVENTION

The invention is set out in the claims. In one embodiment, a method of the invention comprises:
  receiving an input message;
  identifying message components of the input message;
  applying at least one rule to modify at least one message component to create at least one variation of the input message;
  sending a plurality of message variants each to a respective sample of users;
  measuring a response criterion for each message variant; and
  selecting a message variant according to the measured response criterion.

BRIEF DESCRIPTION OF DRAWINGS

FIG. 9 is a screen shot of an example software tool used to define genes and rules.

BEST MODES FOR CARRYING OUT THE INVENTION

Figure 1:
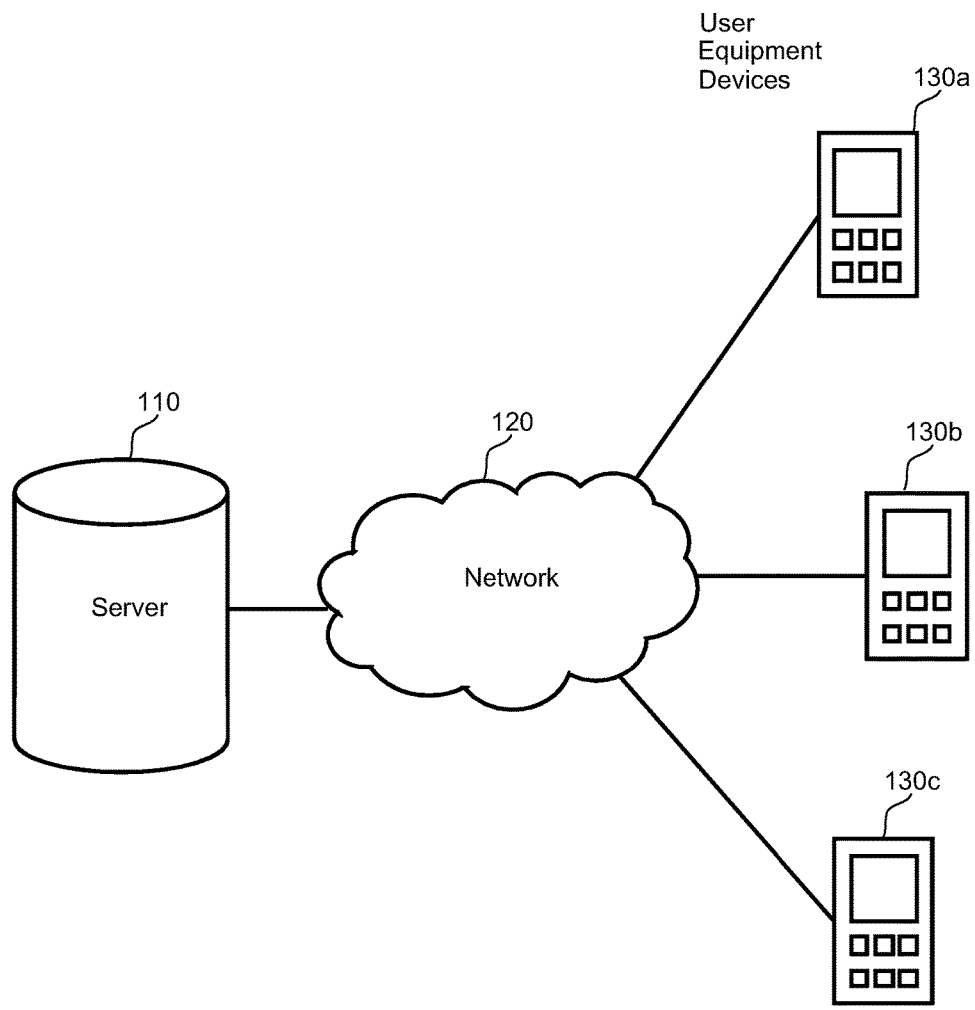
FIG. 1 is a block diagram that illustrates a communication system.

Embodiments optimize the response rate of any short marketing message which contains a call to action. A short marketing message may comprise 300 characters. The purpose, given any marketing pitch, is to be able to compose the optimal way of phrasing the short marketing message in order to maximize response rates. The method works because a majority of people within a group (which is sampled) react in non-intuitive manner to prompts, yet do so in a very consistent way that can be well defined, and if analyzed, predicted.

Marketing agencies and online marketing help software tools test the effect of various ways to phrase a short message in order to maximize the response. None of these methods use a mathematically rigorous algorithm that examines a wide variety of possible alternatives, tests them and arrive to the optimal composition of the short message that delivers an optimized response.

The method will be described in connection with the optimization of marketing messages that consist of a few words (about 300 characters or less), leading to an explicit, or implicit call to action. Examples of these calls to action are the following:
  Call a number
  Send an sms to a number
  Click on a weblink
  Clink on a mobile weblink (aka WAP link)
  Proceed to purchase via the use of a credit card or cash, etc.

The call to action is measurable and is usually of a digital nature.

An example of the method will now be described with reference to a dyslexia related website.

Upon receiving a marketing message that contains a call to action of a digital nature as described above, the method requires the identification of different possible ways to phrase the message and to solicit the same action.

The above is achieved through utilizing lexical, syntactical, and grammatical software tools to identify a plurality of possible alternatives of phrasing the original sentence that is written by the marketer/advertiser. In other words, original words are replaced with possible synonyms within the said language, and possible re-positioning and re-phrasings take place. This gives a finite number of alternatives to phrase the message. Some of these alternatives may actually not make any grammatical or common sense to the consumer.

For example, with reference to a marketing pitch for a dyslexia related website (traffic builder), the input message is:

"FOUR KEY SKILLS THAT HELP WITH DYSLEXIA AND IMPROVE LEARNING"

An example of a couple of synonym alternative is the following:

"four IMPORTANT DEXTERITIES that ASSIST with DYSLEXIA and ENHANCE learning"

"four IMPORTANT SKILLS that HELP with DYSLEXIA and IMPROVE KNOWLEDGE" etc.

After all the synonym alternatives are created, the syntactical alternatives are built. For example:

"HELP DYSLEXIA AND IMPROVE LEARNING WITH FOUR KEY SKILLS"

"IMPROVE LEARNING AND HELP DYSLEXIA WITH FOUR KEY SKILLS"

"HELP DYSLEXIA! IMPROVE LEARNING WITH FOUR KEY SKILLS"

The final step in generating all possible permutations is to eliminate possible words or paraphrase existing phrases. For example:

"HELP FOR DYSLEXIA! KEY SKILLS THAT IMPROVE LEARNING." (four is omitted)

"FOUR KEY SKILLS THAT HELP WITH DYSLEXIA AND MAKE LEARNING EASIER"

The end result of the above step is a finite number of alternative messages which can act as marketing pitches for the same weblink that corresponds to the dyslexia website.

After all different alternatives are listed, the non-sensical alternatives are eliminated.

A grammatical check is performed to identify the nonsense alternatives. These need to be eliminated as possible ways to phrase the same marketing message whose optimized composition is being sought. Following the above example, the following computer generated alternative would have to be eliminated as it makes no sense in English:

"FOUR SKILLS IMPORTANT HELP THAT DYSLEXIA AND LEARNING IMPROVE"

The result of this step is to be left with a finite set of legitimate message alternatives for the same original input message.

The legitimate message alternatives are then tested on sample groups of consumers—the sample sizes are sufficient to provide "statistically significant" results given the expected response rate range.

Different message versions are tested in similar size groups that are statistically significant and representative of the ultimately targeted group. It is important to note that individual characteristics are pitted against its variations while keeping all other variables constant. In our original example, let's assume that after our test we derive the following:

"FOUR SKILLS THAT HELP WITH DYSLEXIA AND IMPROVE LEARNING"—1.8%

"FOUR SKILLS THAT HELP WITH DYSLEXIA AND ENHANCE LEARNING"—2.1%

The above proves that the word "ENHANCE" is more effective than the word "IMPROVE", at least in that particular sequence of words. Alternatively a test can "pit" syntactical choices against others—choices on the ordering/sequencing of words in the said sentence. For example:

"FOUR SKILLS THAT IMPROVE LEARNING AND HELP WITH DYSLEXIA"—3%

"FOUR SKILLS THAT HELP WITH DYSLEXIA AND IMPROVE LEARNING"—1.1%

The above proves that talking about learning before dyslexia, at least with this particular choice of words makes a lot more sense and delivers better response rate. Similar testing is performed on a wide variety of variations to identify best of breed components ("winning ingredients").

Different winning ingredients are combined to compose second and subsequent rounds of messages for testing till the optimization is complete—at that point the invention will have delivered the optimal way to deliver the particular message, in a few words, working with the limitations and information that the original marketer has put in.

So if we take into consideration the results in our example above, we can combine the two elements that we know are more powerful in a more "potent" message—one that uses the word ENHANCE and the sequence of words that is identified as better by the second test. Thus the composed "super message", if all other variables were not to be taken into consideration would be the following:

"FOUR SKILLS THAT ENHANCE LEARNING AND HELP WITH DYSLEXIA"—3.5%

Every change is essentially reduced to what can be called an independent variable and is examined as a factor that affects the dependent variable which is the response rate of the marketing message. Additional rounds of testing are done (as many as needed) in order to derive the optimal message that would consist of the optimal choice of words, in the right sequence and with the necessary, if any, paraphrasing of the original message written by the marketer.

Numerous statistical methods and techniques can be used in order to derive the optimal message and to logically navigate the steps above—these include but are not limited to multivariate analysis, regression, correspondence analysis and redundancy analysis.

The above method allows testing of finite components. These are readily identified and controlled within the context of text advertising and within a constrained number of characters. The testing described allows for a) identification all possible message alternatives and b) the identification of the relative importance of the various message components (or independent variables) with respect to the response rate.

The method is based upon that understanding that small components and changes that "common sense" would dictate as not having any impact in the final response rate, actually do—and in fact up to an incredible degree.

Given the above broad explanation of the method disclosed herein, a more rigorous example will now be described to highlight some additional details.

The components of an input message are identified. These are treated as independent variables which each influence the response rate. The components are identified as A,B,C,D, etc. (for example A is how to say FRUIT)—synonyms is not the only way to go, sometimes related terms can achieve better response rates. The message components can comprise more than one word for example an alternative for the variable IMPROVE can be MAKE THINGS BETTER. Also, message component alternatives can be the call to action of the origination address. That is, the originating address can be considered as another message component, e.g. am SMS message addressed from Vodafone, can be compared to an SMS message addressed from the short number 444.

For each independent variable A, there can be finite alternatives, A(1) to A(a)—for example A(1) is FRUIT, A(2) is PRODUCE, etc.—the size of a depends on the alternatives that are found when implementing the method.

So a short message input into the system is reduced to a vector such as {A, B, C, . . . }. The lexical combinations then become {A(a), B(b), . . . }—essentially a vector of variable sized vectors.

The syntactical combinations that are possible come from the re-arrangement of different vectors within the vector of vectors. So {D(d), A(a), E(e) . . . } can become an alternative that simply signifies ordering the lexical parts of the short message in a different way. All the syntactical combinations of the lexical alternatives define the finite space within which we are optimizing.

Assuming that after constructing a sentence (which is a value of the vector of vectors), it is checked for whether it makes sense or not as it is computer generated. Only sensible alternatives are checked as the test subjects samples are real consumers, sampled from the group of people for which we wish to be optimizing. Keep in mind that this sampling can occur as sampling theory dictates, in a different way for say the subscriber base of a mobile operator compared to the people that are searching for BMW on Google in the United States.

In one embodiment, we first generate and test ALL lexical elements and define the most potent values for {A(a), B(b) . . . }—say that for a certain short message, after the lexical testing of components you reach {A(1),B(3),C(2),D(1)}. For simplicity purposes, let's assume that there are only 4 lexical components.

Then, we generate all ordering permutations, i.e. The syntactical combinations, but of the winning lexical ingredients only. From them we eliminate the ones that are non-sensical, i.e. fail the grammar check. Consider the example where the following message variants are derived as sensible:

{A(1),B(3),C(2),D(1)}
{A(1),C(2),B(3),D(1)}
{B(3),A(1),C(2),D(1)}

These message variants are then each tested in respective groups of subjects to identify the most potent message.

In a further embodiment the testing of lexical and syntactical variations is performed at the same time.

In yet a further embodiment, different variations are tested in separate rounds of testing. Indeed, instead of testing messages and ingredients one at a time, particular combinations are tested and the various importances of the independent variables assessed. This can reduce the total amount of testing required.

The above described embodiments allow a short message to be reduced into various message components that affect the response rate. The message components are handled as independent variables. This allows for the testing of particular components and the combining of favourable traits. In this way a message can be optimized to have the best response criterion in much the same way that a species evolves to fill an ecological niche.

FIG. 1 shows a communications system comprising a communications server 100, a network 120 and a plurality of user equipment devices 130. The communications server 110 sends messages via the network 120 to one or more user equipment devices 130. A user equipment device 130 may comprise a mobile phone, a cellular telephone, a personal digital assistant, a personal computer, a laptop, or any form of communications device. The network 120 may comprise the internet, a local area network, a cellular communications network, or any form of communications network.

Figure 2:
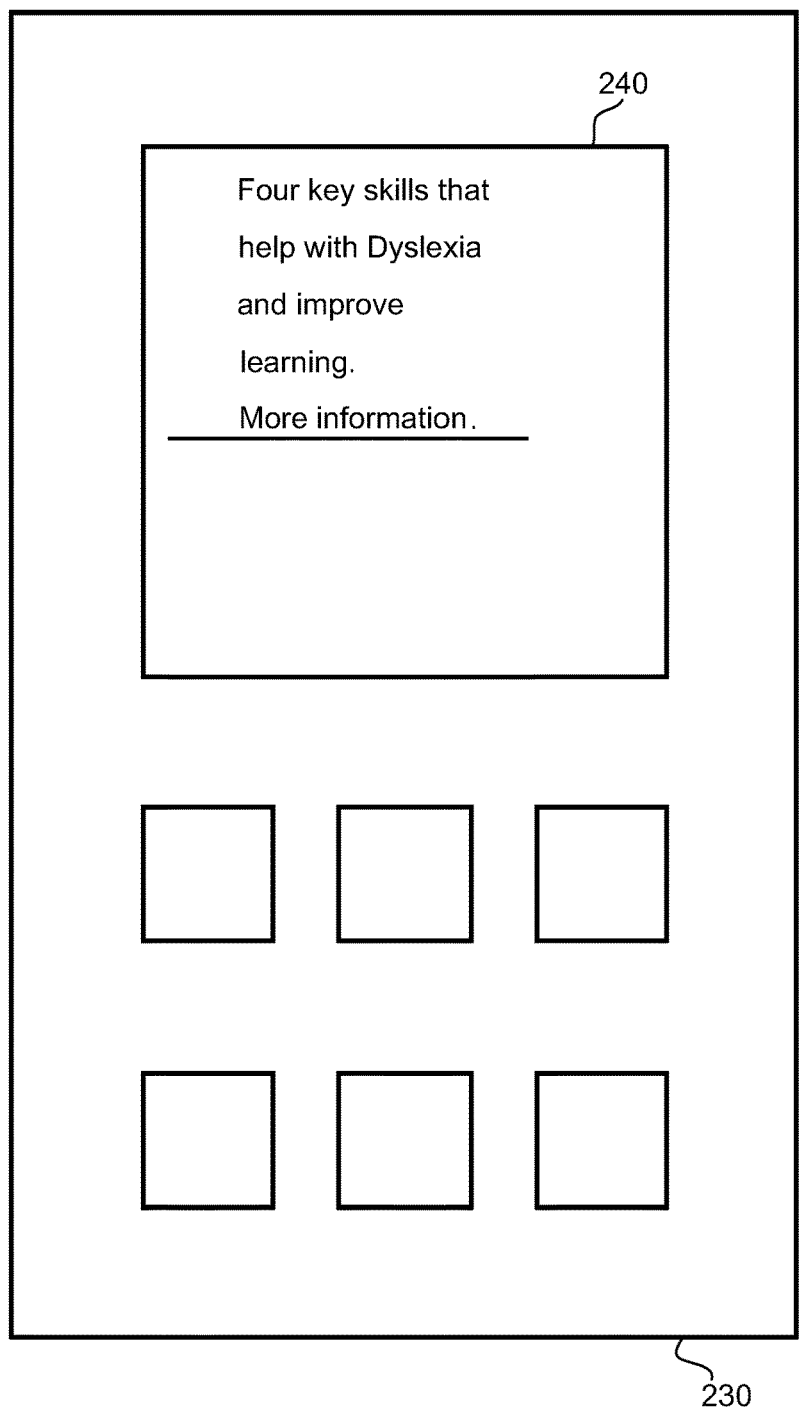
FIG. 2 illustrates a message display on the display of a user equipment device.

FIG. 2 shows a message displayed on the display 240 of a user equipment device 230. The message shown includes a call to action, a hyperlink labelled "More information".

Figure 3:
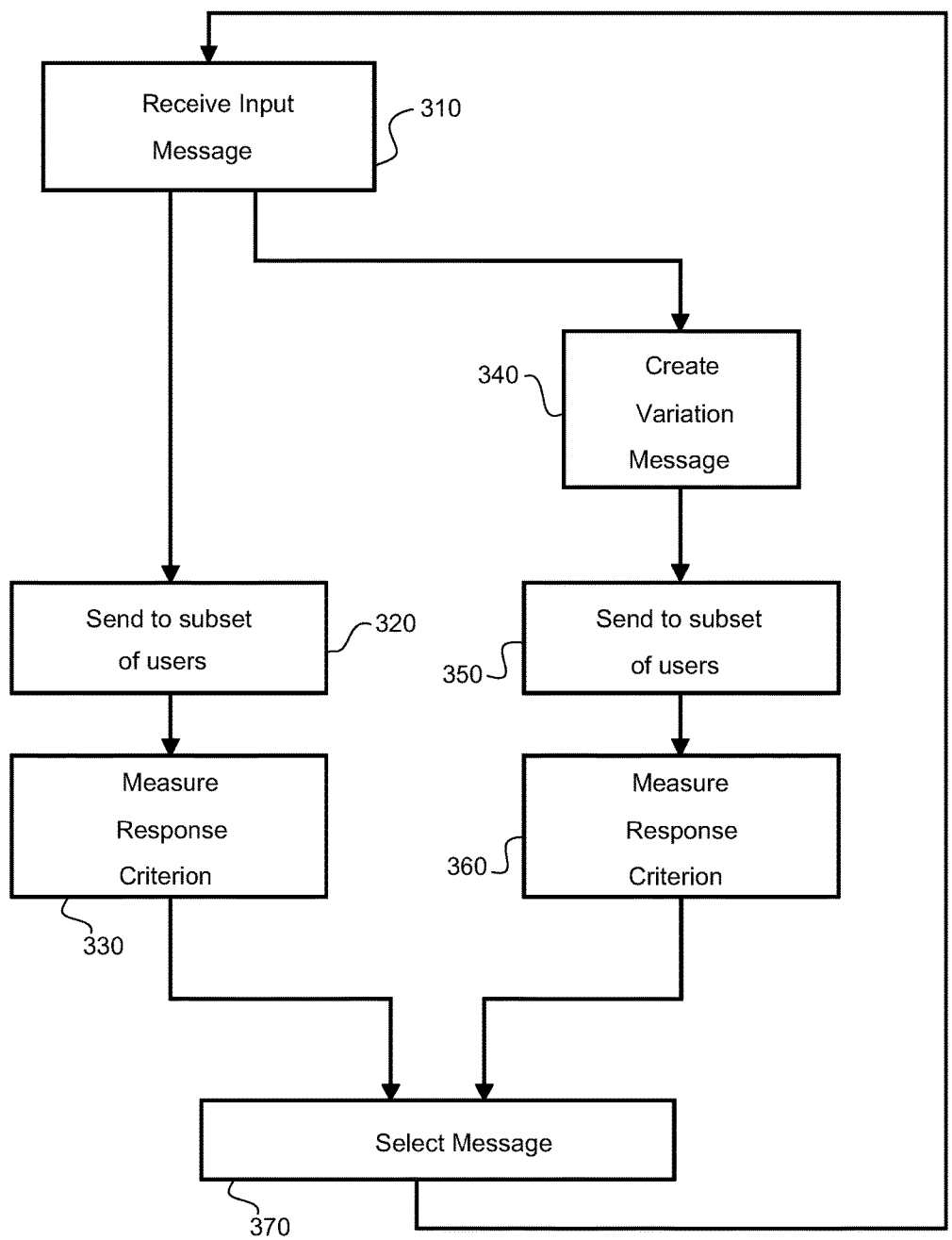
FIG. 3 is a flowchart that illustrates a process of optimizing a message according to one embodiment of the invention.

FIG. 3 shows an iterative process for optimizing a message. This method may be performed in a communications server equipment. The iterative process comprises receiving an input message at 310, sending the received message to a respective subset of users at 320 and measuring a response criterion at 330. The iterative process also comprises creating a variant of the received message at 340. The variant of the received message is sent to a respective subset of users at 350 and a response criterion is measured at 360. The response criteria are compared at 370 and a winning message selected. The winning message is used as the received input message at the start of the next iteration of the iterative process.

Figure 4:
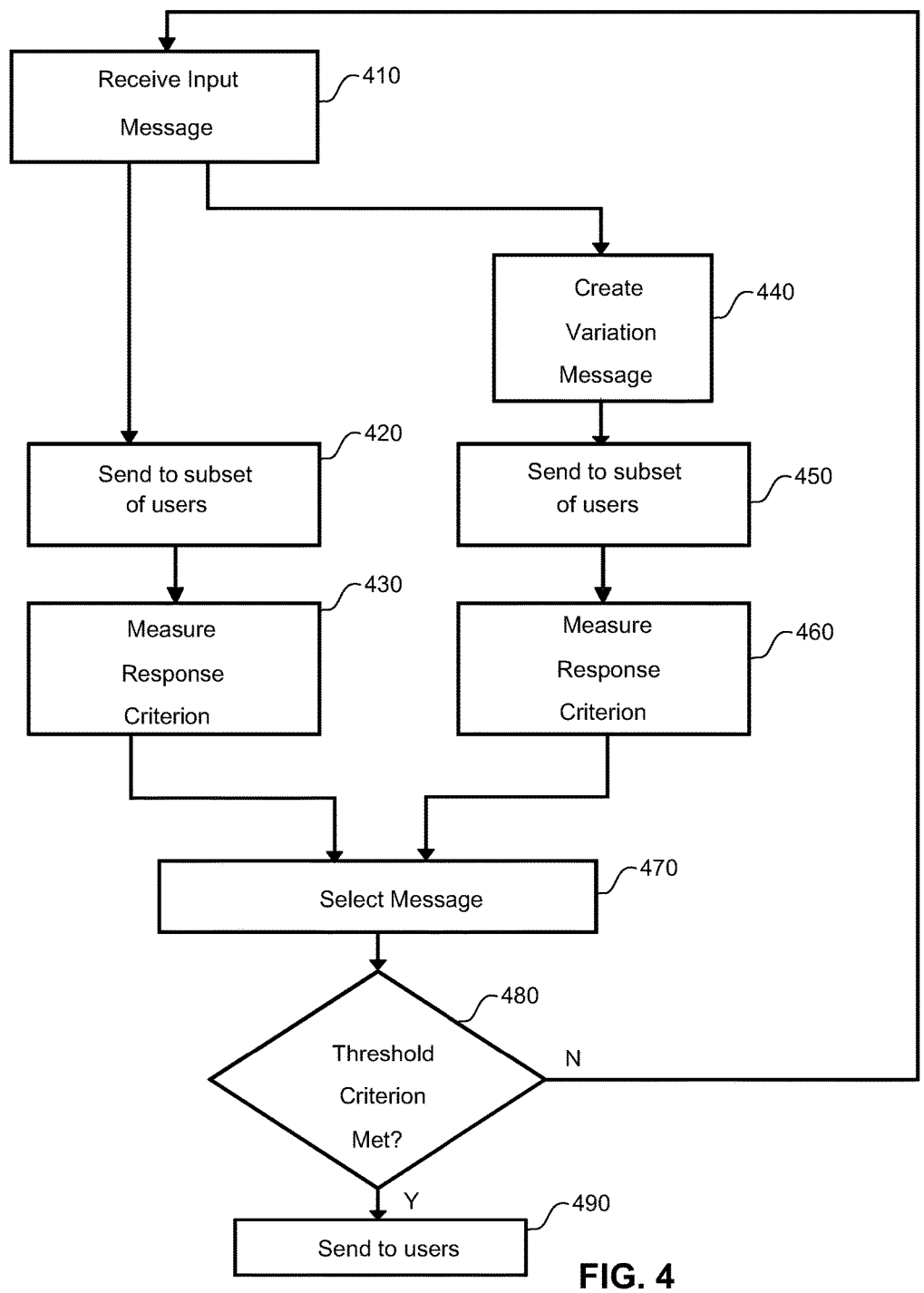
FIG. 4 is a flowchart that illustrates a process for optimizing a message according to one embodiment of the invention.

FIG. 4 shows a modification of the iterative process of FIG. 3. Again, this method may be performed in a communications server equipment. The iterative process comprises receiving an input message at 410, sending the received message to a respective subset of users at 420 and measuring a response criterion at 430. The iterative process also comprises creating a variant of the received message at 440. The variant of the received message is sent to a respective subset of users at 450 and a response criterion is measured at 460. The measured response criteria are compared at 470 and a winning message selected. Then, at 480, a determination is made as to whether a threshold criterion has been met. The threshold criterion may be a threshold number of iterations of the iterative process being completed, and/or a threshold measured response criterion. If the threshold criterion is not met, then the winning message is used as the received input message at the start of the next iteration of the iterative process. If the threshold criterion is met, then the winning message is selected as the message to be sent to a plurality of users at 490.

Figure 5:
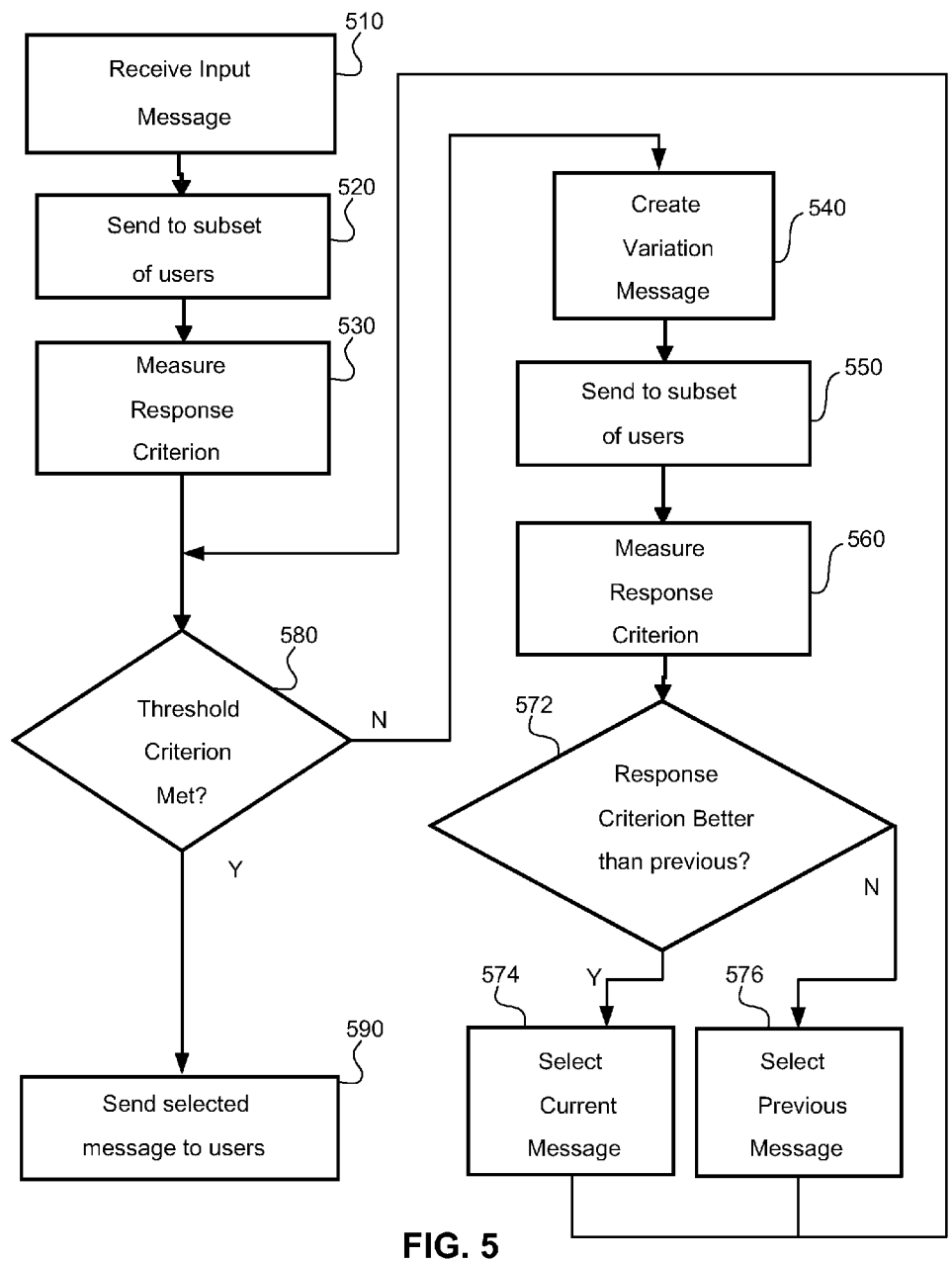
FIG. 5 is a flowchart that illustrates a method for optimizing a message according to one embodiment of the invention.

FIG. 5 shows a method for optimizing a message. This method may be performed in a communications server equipment. The iterative process comprises receiving an input message at 510, sending the received message to a respective subset of users at 520 and measuring a response criterion at 530. Then, at 580, a determination is made as to whether a threshold criterion has been met. The threshold criterion may be a threshold number of iterations of the iterative process being completed, and/or a threshold measured response criterion. If the threshold criterion is met, then the winning message is selected as the message to be sent to a plurality of users at 590.

If the threshold criterion is not met, then the winning message is modified at 540 to create a variant message. The variant message is sent to a respective subset of users at 550 and a response criterion is measured at 560. At 572, the response criterion measured at 560 is compared to the response criteria of the first message measured at 530 (or the previous most successful message measured at 572 in a previous iteration) and a winning message selected at 574 or 576. The process then returns to 580 and a determination is made as to whether a threshold criterion has been met.

In this way, the process of FIG. 5 provides a method which causes the repeated variation of testing of a message, with the variant message compared to the previous best and discarded or used as the basis for further variation dependent upon the measured response criterion.

Figure 6:
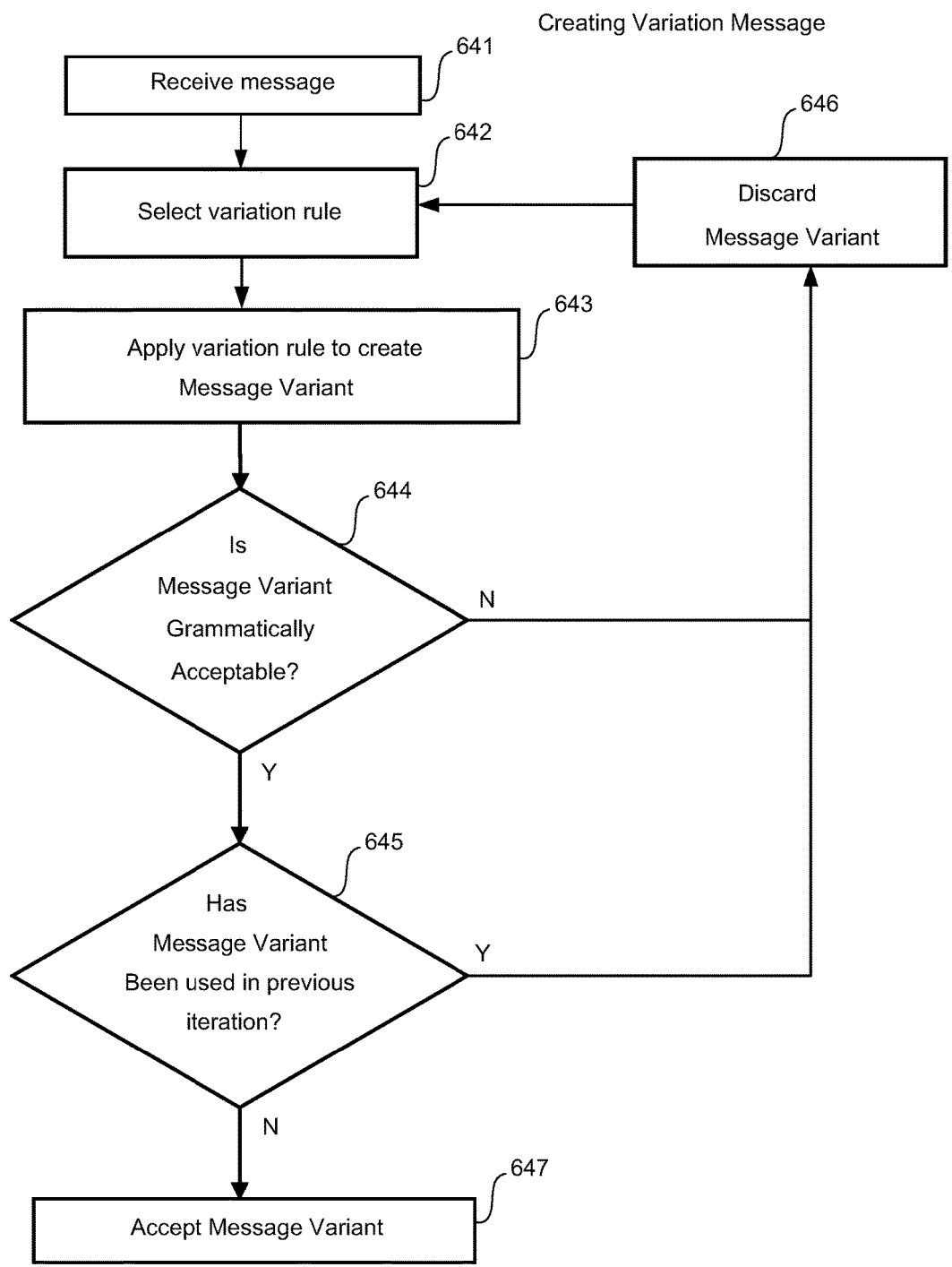
FIG. 6 is a flowchart that illustrates a method for creating a message variant according to one embodiment of the invention.

FIG. 6 shows a method for creating a message variant. A message to be modified is received at 641. A variation rule is selected at 642. The variation rule may be selected at random, or may be selected according to a predetermined order of rule application. At 643 the selected rule is applied to the received message to create a message variant. At 644 a determination is made as to whether the message variant is grammatically acceptable. If the message variant is not grammatically acceptable the message is discarded at 646 and a different variation rule is selected at 642. If the message variant is determined to be grammatically acceptable at 644, the process proceeds to 645 and a determination is made as to whether the message variant has been used in a previous iteration. If the message variant has been used in a previous iteration, the message is discarded at 646 and a different variation rule is selected at 642. If the message variant has not been used in a previous iteration, the message variant is output as acceptable at 647. The acceptable message variant may then be tested on a sample of users.

Figure 7:
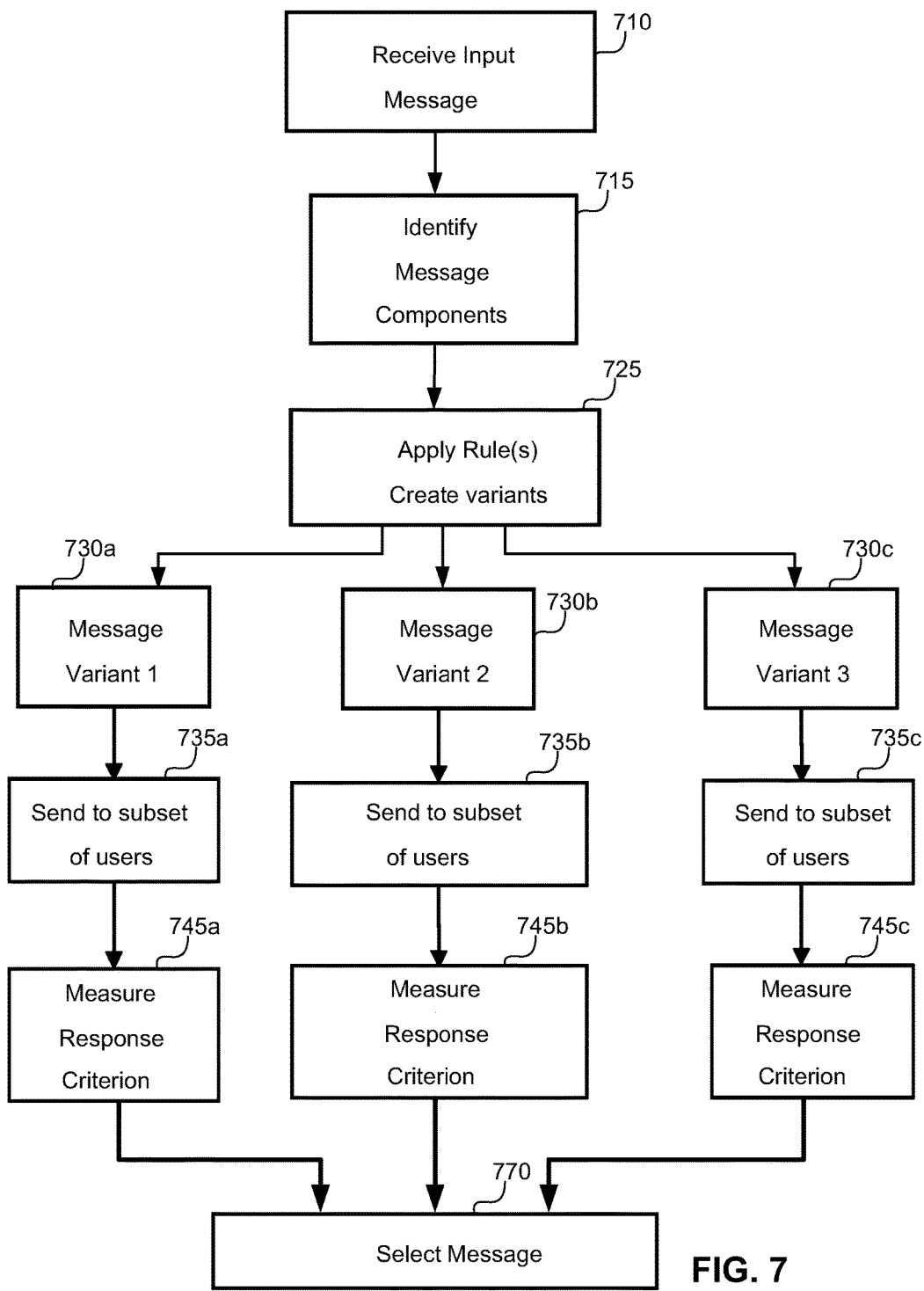
FIG. 7 is a flowchart that illustrates a method for optimizing a message according to one embodiment of the invention.

FIG. 7 shows a further method of optimizing a message, the method comprising receiving an input message at 710. Components of the input message are then identified at 715. Message components may comprise words or phrases. At 725 a plurality of rules are applied to generate a plurality of message variants. In FIG. 7 three message variants are shown 730a, 730b and 730c, but in practice many more variants may be created. At 735a, 735b and 735c, each message variant is sent to a respective plurality of users, and at 745a, 745b and 745c, a response criterion for each message is measured. At 770, the measured response criteria are compared and a winning message selected.

The method of FIG. 7 may be further modified to include further testing, wherein optimum messages are identified at 770 and winning traits identified. Optimum components are identified by making a comparison between similar message variants with a particular variation of one particular component. These optimum components are combined to create a subsequent plurality of message variants, which are tested by sending to further respective pluralities of users.

The identification of optimum components and creation of new generations of optimized message variants which are then tested can be repeated in a plurality of iterations until a threshold criterion is met and an optimized message is generated.

FIGS. 8-14 and the corresponding description below set forth further embodiments of the invention.

As discussed above, message variants may be created by defining key components of the message, treating the key components as variables, and identifying finite alternatives for such key components. In the embodiments described below, a key component that can be manipulated is referred to as a "gene." A gene is a sentence part or message part that can be manipulated in one or more ways. As will be discussed below, there also can be "intangible genes" that represent attributes of a message.

Examples of types of genes are as follows:
i. "Intro" gene: This is usually the first word or words in a message, and it is often accompanied by an exclamation point.

ii. "Call to action" gene: A part of the message that asks the recipient to respond and explains to him how to do so.

iii. "Call to action position" gene: This gene specifies where in the message the call to action appears (i.e., whether it appears before or after the explanation of the proposed deal).

iv. "Imperative in the call to action" gene: Example: send vs. reply v. "Adjective for the product" gene: The adjective used to describe a product. For example, is the internet service "fast" or "rapid"?

vi. "Product": The description of the product.

vii. "Sender": The name used for the sender viii. "Price" gene: Price phrase for product As an example, take the message:

"Surprise! Are you ready for the real mobile internet? 500 MB of internet+unlimited Vodafone live+2 months free for only $3.99/month! Just send YES to 400!"

Figure 8A:
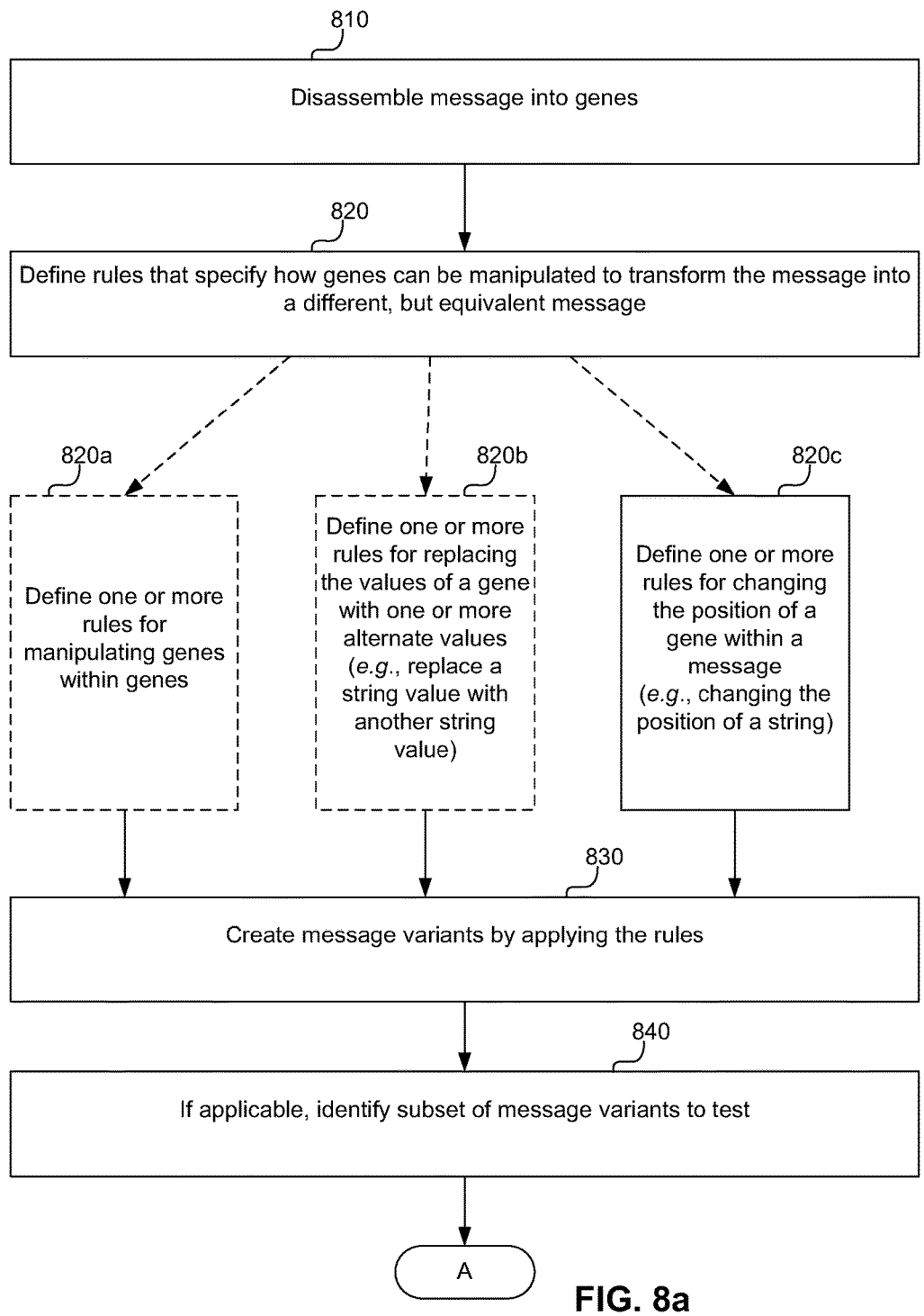
FIGS. 8a-b are flowcharts that illustrate a method for optimizing a message according to one embodiment of the invention.
Figure 8B:
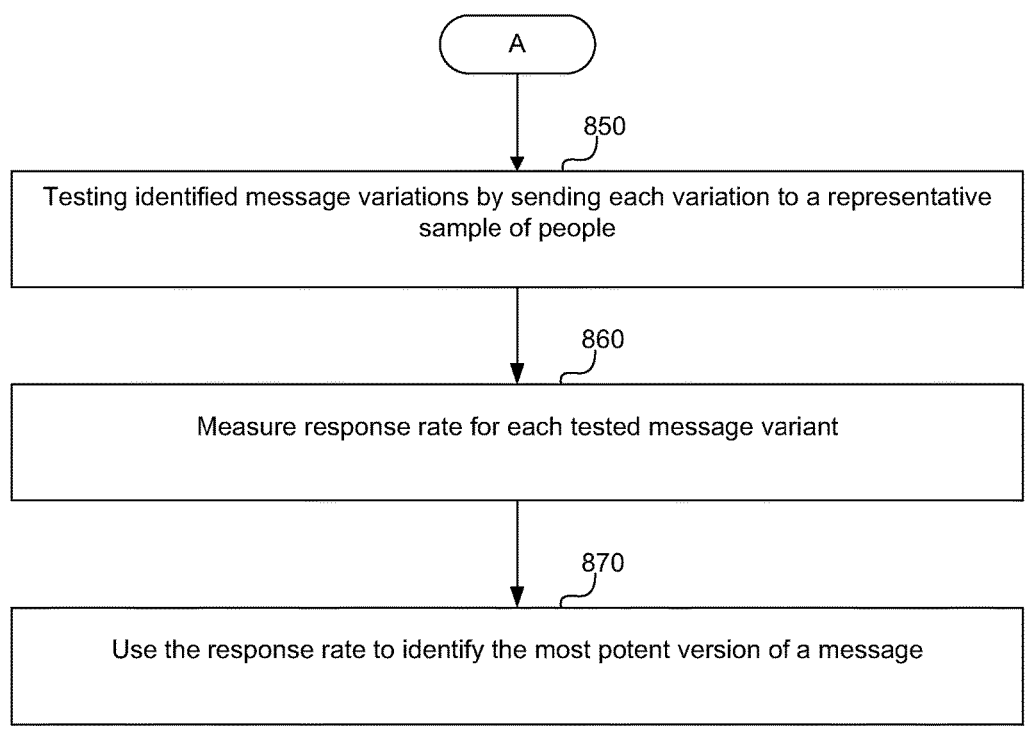

One way in which the above messages can be disassembled into genes is as follows:

"Intro" gene: Surprise!
"Call to Action" gene: Just send YES to 400!
"Product 1" gene: 500 MB of internet+
"Product 2" gene: unlimited Vodafone live+
"Price" gene: for only $3.99/month FIGS. 8a-8b illustrate a method for optimizing a message using genes. A user disassembles the message into genes (i.e., key components) (step 810). A user then defines rules that specify the ways the genes can be manipulated to transform the message into different, but equivalent messages (step 820). For example, the user may define rules for replacing the value of a gene within one or more alternate values (i.e., replacing the string value of a gene with another string value) (step 820b). Alternately or in addition, the user may define rules for changing the position of a gene within a message (i.e., changing the position of a string) (step 820c). Furthermore, the user may define rules for manipulating "genes within genes," which will be described in more detail below (step 820a). The above are examples of ways in which genes can be manipulated, and those skilled in the art will appreciate that there may be other ways to manipulate genes.

An equivalent message may or may not be semantically the same as the original message, but it essentially conveys the same message. For example, if the original message is a product offer, an equivalent message would have the same product offer but might phrase it differently.

Message variants are created by applying the rules (step 830). The number of potential message variations grows exponentially with the number of genes. For example, if there are seven genes with five possible values each, then there are 78,000 variations of the message. It is not always practical to test a large number of variations, and, in such cases, a subset of message variants is identified to test (step 840). As will be discussed in more detail below, experimental design is used in one embodiment to identify the subset.

A supervised learning method is applied to identify the best combination of gene values for the message. Specifically, the identified message variations are tested by sending each variation to a representative sample of people (step 850), and the response rate is measured for each message variant (step 860). In one embodiment, the response rate is measured for each message variant by dividing the number of people who responded to the message by the number of people to whom the message was sent. What is considered a response varies and depends on the call to action in the message (e.g., call a number, send an SMS, click on a link). The response rate is used to identify the best message (step 870). As will be discussed with respect to FIG. 10, the process of identifying the best message may be an iterative process. In step 870, the response rate may be used to identify good values for genes, and the message designer may repeat some of the steps of FIGS. 8*a-b* to further "drill down" and optimize the message. Furthermore, an algorithm, such as regression analysis, may be applied to the response results to identify the best gene values, taking into account interactions between gene values.

FIG. 9 illustrates a screen shot of a software tool used to define genes and rules. Window 910 displays the message to be optimized. Table 915 illustrates the genes that the user has specified for the message. Table 920 illustrates the rules the user has defined for creating message variants. The first three rows of table 920 contain rules that specify alternate values for the INTRO, PRODUCT 1, and PRODUCT 2 genes. Row 4 specifies that that the CTA (Call to Action) gene can be moved in front of the INTRO gene.

As stated above, when a message designer creates genes and values, the number of potential combinations grows exponentially with the number of genes and often gets to numbers that do not make sense to test. In one embodiment, a multivariate analysis method, such as experimental design, is used to choose a representative subset of message variants to test. For purposes of this discussion, a "design" for a message is the chosen representative subset along with the algorithm used to produce the subset. Types of designs that can be used include:

Orthogonal designs: These are designs in which each factor can be evaluated independently of all other factors. A good design is balanced and orthogonal.

D-Optimal designs: These are designs that approximate orthogonal designs in cases where orthogonal designs are impossible to find. The approximation is by an optimization computer algorithm. In one embodiment of the present invention, D-Optimal designs are used.

Mixed designs: Designs in which not all genes have the same amount of values.

Hierarchical designs: Designs that allow "conditional" genes, such as a gene within a gene, which is described below.

Fractional factorial designs: Fractional factorial designs are experimental designs consisting of a fractional subset of the experimental runs chosen combinatorially from a full factorial design.

Those skilled in the art will appreciate that other forms of multivariate analysis can be used instead of experimental design.

Figure 10A:
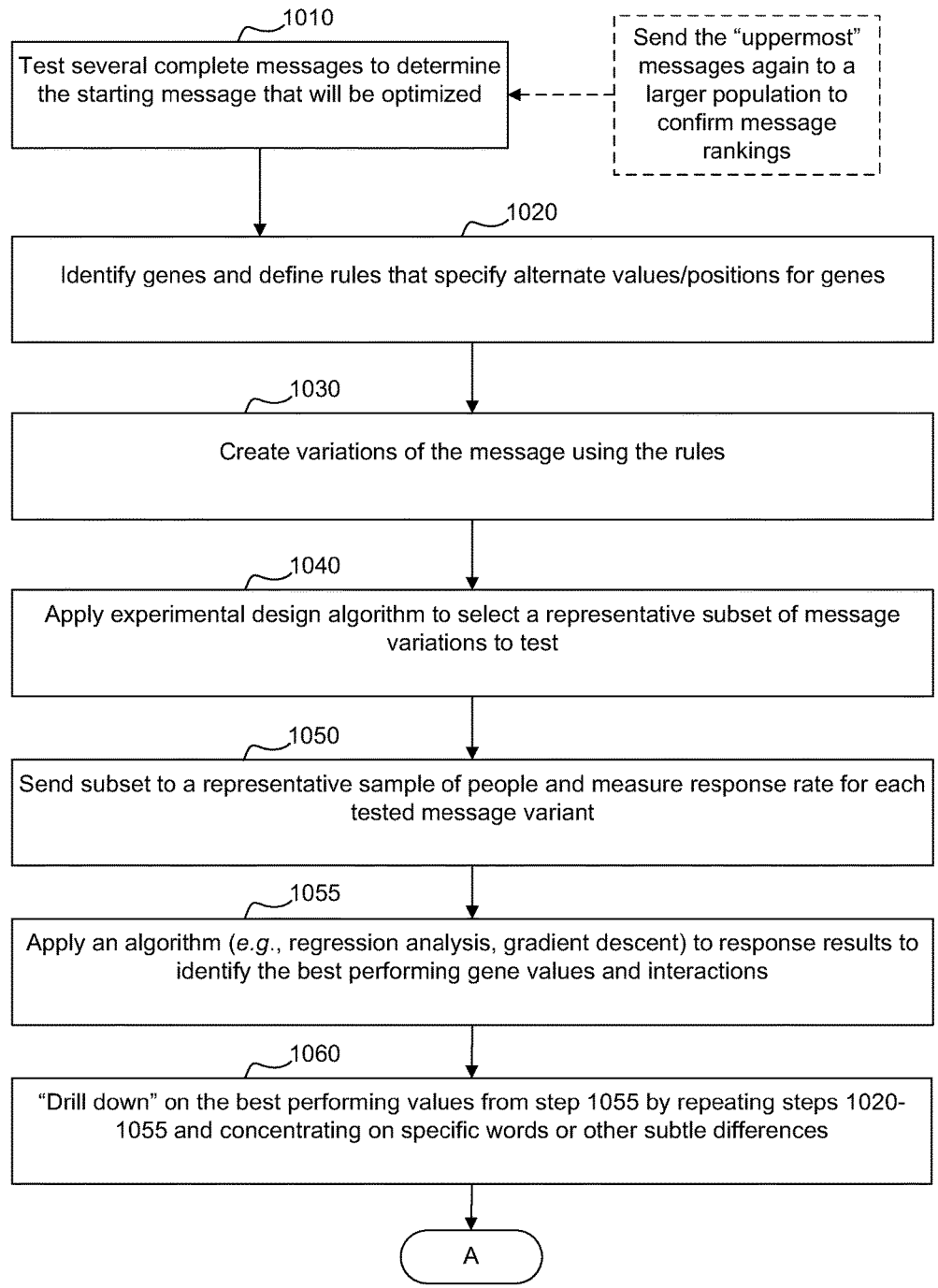
FIGS. 10a-b are flowcharts that illustrate a method for optimizing a message according to one embodiment of the invention.
Figure 10B:
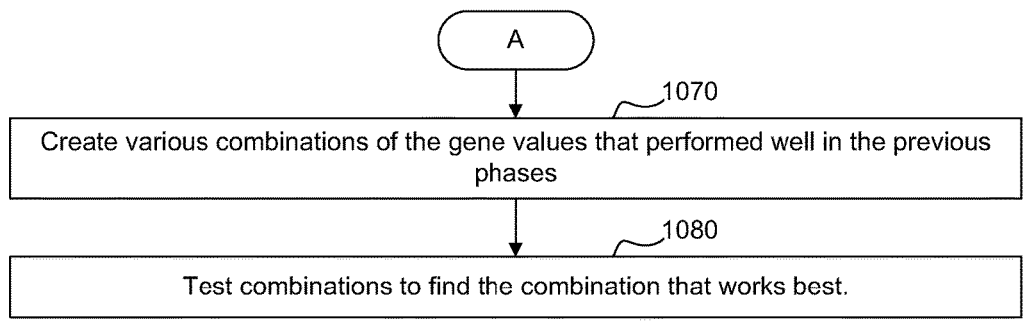

As illustrated in FIGS. 10*a-b*, the steps of specifying genes, defining rules, and testing message variants may occur repeatedly in multiple supervised learning phases in order to efficiently identify the most potent message. The performance of message variants from a previous phase is used to determine the message variants that will be created and tested in the next phase.

First, a message designer may test several complete messages to determine the starting message that will be optimized (step 1010). Initially, the message designer may send a variety of messages to a relatively small sample of recipients, and then send the "uppermost" messages (i.e., the messages with the best responses rates) to a larger population to confirm the message rankings. The message with the best response rate is usually chosen as the starting message.

The message designer then identifies genes and defines rules that specify alternate values or positions for the genes (step 1020). Variations of the message are created using the rules (step 1030), and an experimental design algorithm (e.g., a D-Optimal algorithm) is applied to select a representative subset of message variations to test (step 1040). The subset is then sent to a representative sample of people and response rates are measured for each message variations tested (step 1050). An algorithm, such as regression analysis, is applied to the response results to identify the best performing gene values and interactions between gene values (step 1055). Other types of algorithms that can be used include (but are not limited to) gradient descent and genetic algorithms.

The message designer then essentially repeats steps 1020-1055 by "drilling down" from coarse to fine on the best performing gene values. For example, the designer may concentrate on specific words instead of larger phrases or concentrate on other more subtle differences. In other words, a message designer may define genes that relate to specific words (instead of larger phrases) or other subtle differences.

In the preferred embodiment, steps 1020-1060 are used to determine the best value(s) for each gene. Then, in step 1070, various combinations of the best gene values are created, and such combinations are tested to find the combination that works best (step 1080). One reason that multiple combinations may be created and tested is to ensure that combinations of gene values work well together as a whole sentence or message. Individual gene values may test well, but may not work well together. This step is used to identify the combination of gene values that work the best. Another reason for testing multiple combinations is that sometime genes have two close values that performed well, and it is desirable to confirm the best values and interactions by testing them on a larger population. The combination with the best response rate is identified as the most potent message.

In one embodiment, the method illustrated in FIG. 10 is essentially a four phase process with the following phases:
1. Determining the starting message by testing several complete messages that test several different directions (step 1010)
2. Define genes and identifying the best values for the genes. In addition to the string value of a gene, the position of gene within a message can also be a gene value. (steps 1020-1055)
3. Repeat step 2 and "drill down" on best performing gene values from course to fine to concentrate on specific words or other subtle differences (step 1060)
4. Test combinations of the best-performing gene values to find the best combination for the whole message (steps 1070-1080)

The messages tested in each of phases 2-4 are based on the performance of messages tested in the previous phase. For example, the messages created and tested in phase 2 are based on the performance of messages in phase 1, the messages created and tested in phase 3 are based on the performance of the messages in phase 2, and the messages created and tested in phase 4 are based on the performance of the messages in phase 3. Those skilled in the art will appreciate that there may be less or more than four phases.

The method of FIGS. 10*a-b* is not limited to a method in which key components are defined as "genes." Other ways to define key components of a message may be used with this method.

Figure 11:
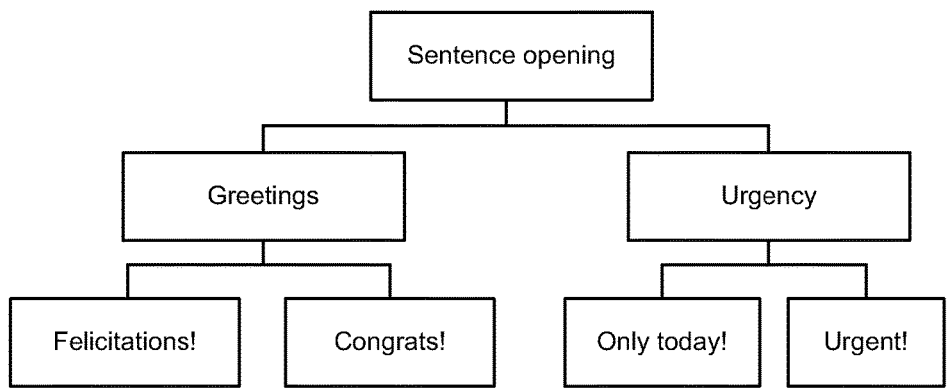
FIG. 11 illustrates an example of two families of values for a sentence opening.
Figure 12:
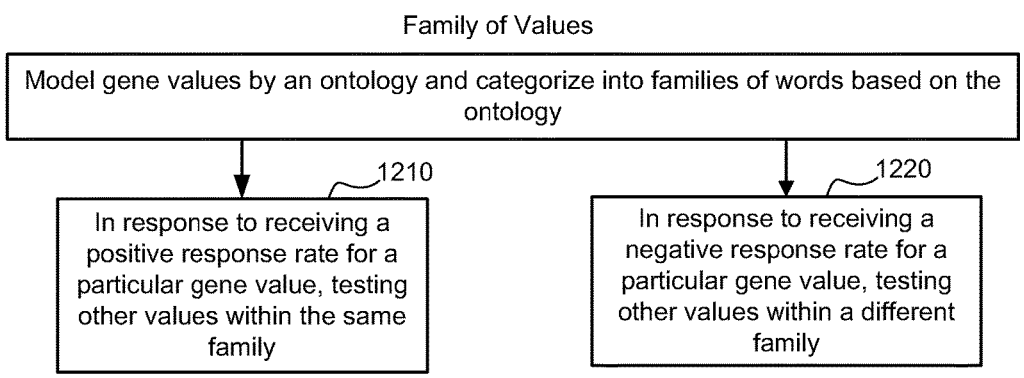
FIG. 12 is a flowchart that illustrates using family of values to narrow down variations to test according to one embodiment of the invention.

In one embodiment, values for genes are modelled by an ontology and are categorized into "families" of words. Words with equivalent meaning or effect (or are otherwise related according to the ontology) may be categorized into the same family. For example, opening words for a message, like "Congrats!" and "Felicitations!" would typically be in the same family. FIG. 11 illustrates an example of two families of values for a sentence opening. "Felicitations" and "Congrats" fall under the "Greetings" category. "Only Today!" and "Urgent" fall under the "Urgency" category. Families of values may be used as an efficient way to narrow down the variations to test. This is illustrated in FIG. 12. For example, if "Congrats" gets a good response rate, then a message optimization system would likely try "Felicitations" (e.g., step 1210). Contrarily, if "Only Today!" did not get a good response rate, the message optimization system would be less likely to try "Urgent!" (e.g., step 1220).

Figure 13:
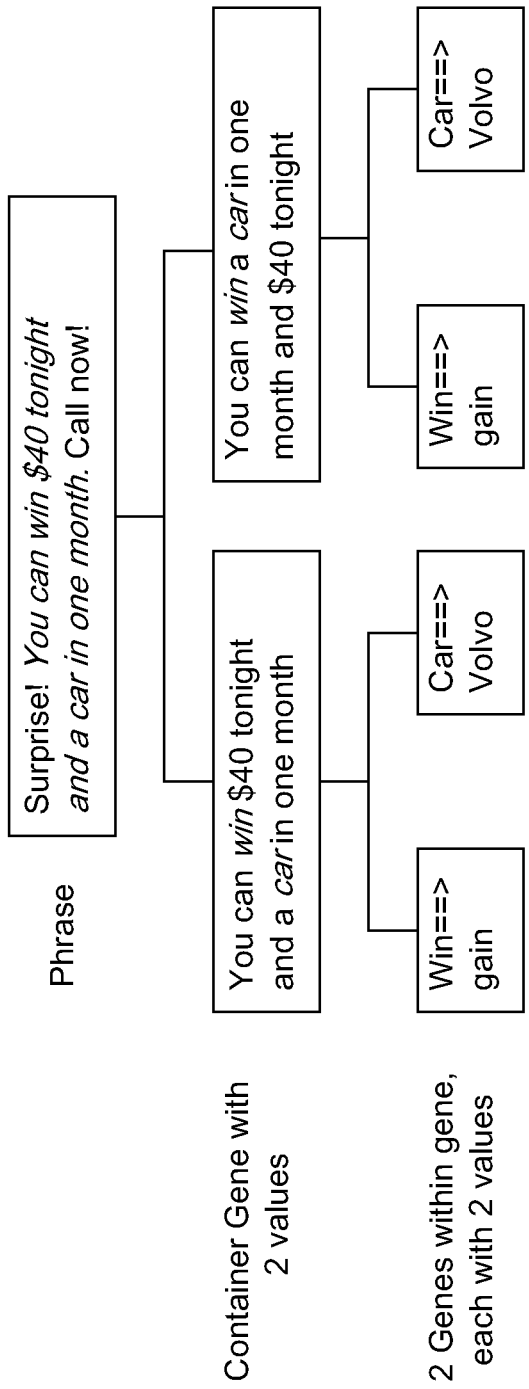
FIG. 13 illustrates an example of genes within genes.

If a phrase in a message is defined as a gene, such phrase can include additional genes. This is referred to as a "gene within a gene." FIG. 13 illustrates an example of a "genes within genes." In FIG. 13, the phrase "You can win $40 tonight and a car in one month" is a defined as a gene. FIG. 13 illustrates two string values for the gene: (i) the original value and (ii) the value "You can win a car in one month and $40 tonight." These two values are "container gene values," as they each contain two other genes, namely "win" and "car," which are referred to as "contained genes." The container gene string value depends on the string value of the contained gene. The gene within a gene structure enables container genes and contained genes to be tested at the same time. The alternate is to first decide on the best value for the container gene and then focus on the words inside of it. However, this takes more rounds of testing, which is not always an option. Furthermore, the gene within a gene structure helps a message designer analyze the relationship between the container gene and the contained gene (i.e., how they interact).

Figure 14:
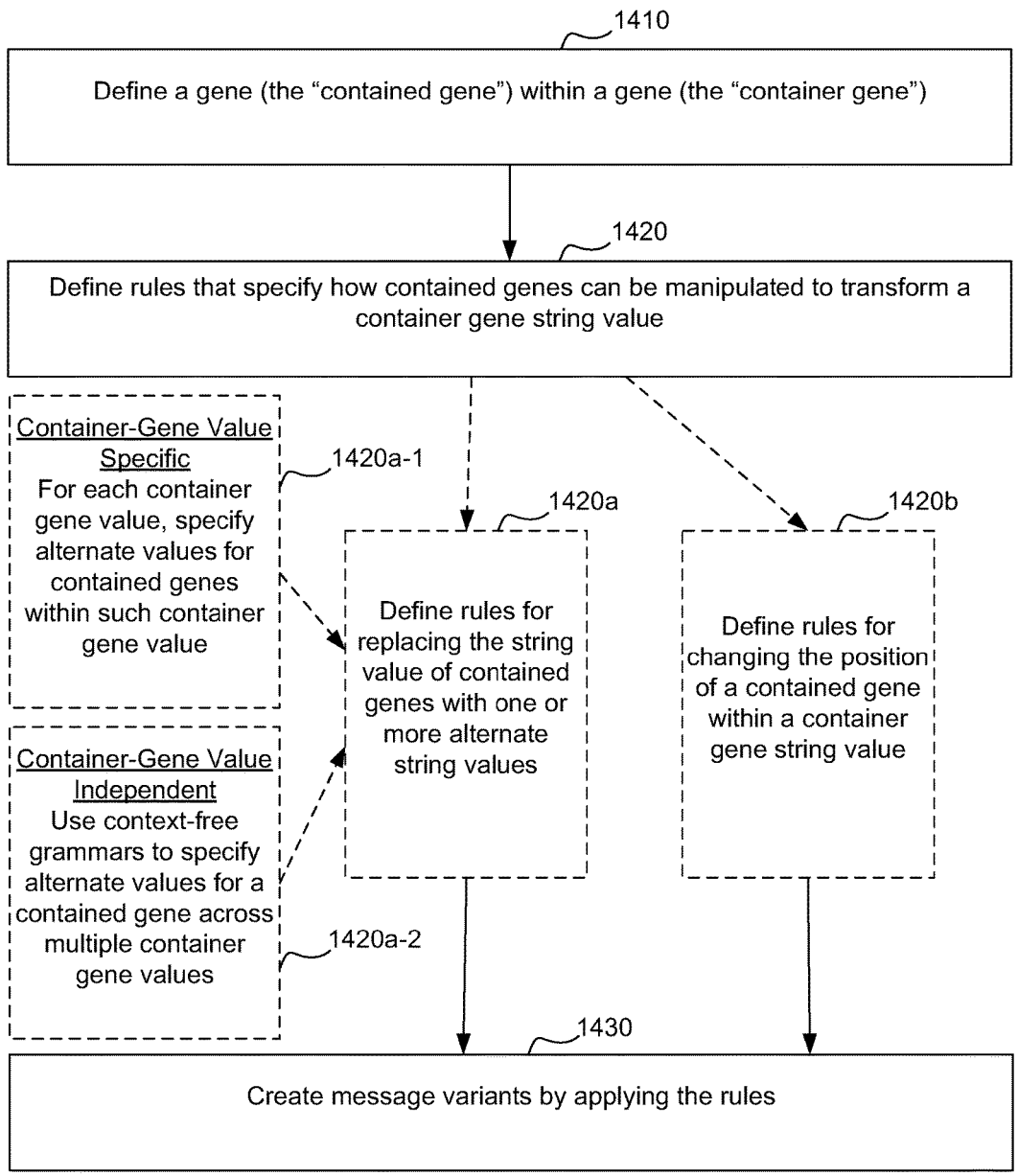
FIG. 14 is a flowchart that illustrates a method for using genes within genes according to one embodiment of the invention.

FIG. 14 illustrates a method for using "genes within genes." A message designer defines one or more contained genes within a container gene string value (step 1410). The message designer then defines rules that specify how the contained genes can be manipulated, thereby also altering the string value of the container gene (step 1420). For example, the message designer may define rules for changing the position of a contained gene within a container gene string value (step 1420*b*). Furthermore, the message designer may define rules for replacing the string value of contained genes with alternate string values (step 1420*a*). Message variants are created by applying the rules (step 1430).

The rules for replacing the string value of contained genes can either be different for each container gene value (step 1420*a*-1) or they can be the same for all container values (step 1420*a*-2). FIG. 13 illustrates a scenario (in the third row) where contained gene values are defined for each container gene value.

Context-free grammars (or a similar construct) can be used to define rules for contained genes that apply across container gene values. Below is an example of a rule (taken from the example in FIG. 13) that uses a structure similar to context-free grammars:

PRIZE gene→Surprise! You can <wingain>$40 tonight and <Car_Prize>. Call now!|Surprise! You can <wingain><Car_Prize> and $40 tonight. Call now!
Car_Prize→car|Volvo
Wingain→win|gain The left side variable can be replaced by any string on the right side. On the right side, there can be a variable as well, thereby enabling a hierarchical structure. When there are multiple values for container genes, context-free grammars (or a similar construct) enable rules for manipulating container genes and contained genes to be written more efficiently.

In one embodiment, "intangible genes" are used to optimize a message. "Intangible genes" represent attributes of a message. Examples of attributes represented by intangible genes include the following:
  i. The formality level:
    Dear Sir, we would like to offer you a 4 MB internet plan at $5/month. Please reply 'Yes" to accept.
    vs.
    Dude, reply Tes' to get Vodafone's cool 4 MB internet plan at only $5/month!
  ii. The tense—question vs. imperative
    How about getting Vodafone's 4 MB internet plan for $5/month? All you have to do is send 'Yes'
    vs.
    Reply Tes' now to get Vodafone's 4 MB internet plan for $5/month.
  iii. Loss aversion/peer pressure effect vs. winning something
    Don't be left behind! Everybody already has Vodafone's 4 MB internet plan! Send TES' to get it for $5/month.
    vs.
    A unique opportunity to get 4 MB internet with only $5/month! No better deal exists.

Multiple intangible genes can be combined in a single message. For example, a sentence can be both in imperative and show loss aversion. In one embodiment, a statistician, using experimental design methods, gives the message designer a subset of all possible combinations of intangible genes. For instance, the statistician may provide the message designer with the following subset:
  Message 1: Formal+question+loss aversion
  Message 2: informal+questions+winning feeling The message designer then creates messages with the above attributes that are as similar as possible in other attributes. An example of a message with the attributes of message 1 above is:
  Dear Sir, would you like to win a unique 4 MB internet plan offer at $5/month? Please reply TES' to purchase.

The created messages are tested to find which attributes worked well and which combination of attributes worked well. Once the best attributes and combinations are identified, the wording of the message is tested in the ways described above with respect to FIGS. 8-14. Choosing the best message is based both on the "intangible" genes and the wording of the message.

Figure 15:
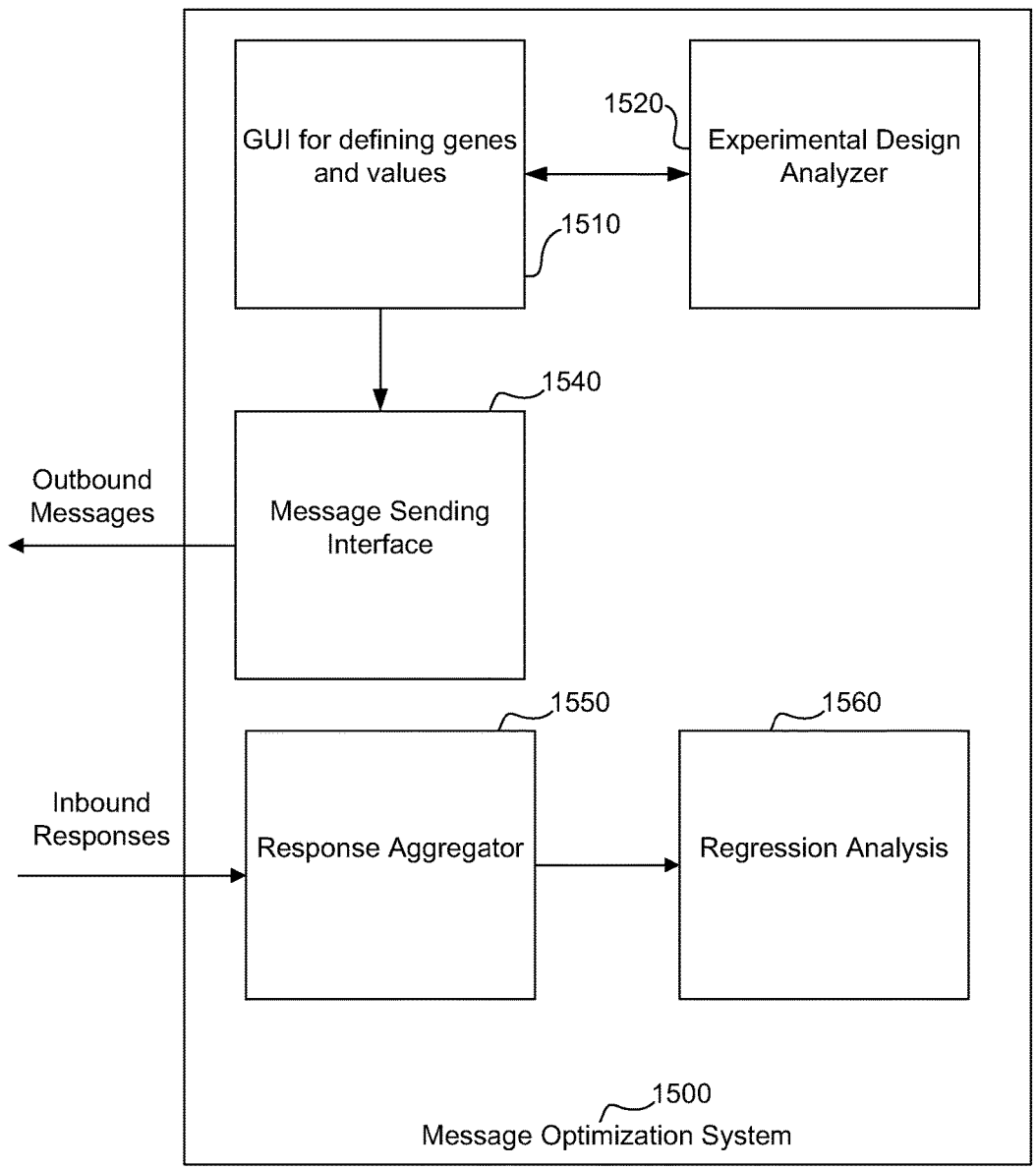
FIG. 15 is a block diagram that illustrates an example message optimization system according to one embodiment of the invention.

FIG. 15 illustrates an example of a message optimization system for implementing the method described with respect to FIGS. 8-14. The modules illustrated in FIG. 15 are software modules executed by a computer system. The system illustrated in FIG. 15 is just an example of a system architecture, and the present invention is not limited to the system architecture illustrated in FIG. 15.

The message optimization system 1500 includes a graphical user interface 1510 for defining genes and values. The GUI is a software tool that enables a message designer to define genes and values, such as the GUI illustrated in FIG. 9. GUI 1510 also enables a message designer to drill down from course to fine and to create combinations of the best values.

An Experimental Design Analyzer 1520 performs the experimental design analysis to derive a design. A message designer uses the GUI 1510 to create the message variants based on the design. Alternately, messages may be generated automatically by a software module that uses the design and gene values as input. The messages are sent to a representative sample of people via Message Sending Interface 1540. A Response Aggregator 1550 tracks and aggregates messages responses. A Regression Analysis module 1560 performs regression analysis on response rates for applicable messages.

In an alternate embodiment of the invention, the steps of defining genes and gene values, as well as creating combinations of the best gene values, can be performed automatically by a computer program instead of manually by a message designer.

The methods described herein are not limited to optimizing advertisement/promotional messages. They can be used to optimize articles, books, and other compilations of words. The invention is not restricted to the features of the described embodiments. It will be readily apparent to those skilled in the art that it is possible to embody the invention in specific forms other than those of the described embodiments above.

The invention claimed is:

1. A method performed by a communications system including a communications server in communication with one or more communications devices for automatically optimizing a message text, the method comprising:
   receiving on the communications server a message text comprising a plurality of words or word phrases that combine together as non-overlapping parts of the message text;
   treating the non-overlapping words or word phrases of the message text as multiple independent variables that are reduced to a message vector having each of the multiple independent variables as components of the message vector;
   automatically creating on the communications server a plurality of lexical variants of the message text, wherein the lexical variants are created by replacing a word or word phrase for each of the multiple independent variables with one or more alternate words or word phrases based on one or more value-changing rules being applied to the received word or word phrase in the message text, the lexical variants for each of the multiple independent variables being reduced to a lexical vector such that the message vector is made up of variable-sized lexical vectors;
   selecting a subset from the plurality of created lexical variants of the message text based on an optimal experimental design;
   sending each of the subset of created lexical variants of the message text to the one or more communications devices;
   measuring a response rate for each sent lexical variant of the message text;
   identifying one or more lexical variants having the best performing measured response rates for each of the lexical vectors;
   automatically creating on the communications server syntactical variants of the identified best performing lexical variants by rearranging the lexical vectors within the message vector based on one or more position-changing rules;
   sending a plurality of the syntactical variants of the identified best performing lexical variants to the one or more communications devices, wherein only grammatically-correct syntactical variants are sent;
   measuring a response rate for each of the sent syntactical variants; and
   identifying a message text having the highest measured response rate for the sent syntactical variants.

2. The method of claim 1, wherein the optimal experimental design used to select a subset from the plurality of created lexical variants of the message text is a D-optimal design.

3. The method of claim 1, wherein the lexical variants of the message text are created and tested in a plurality of phases, wherein the performance of lexical variants of the message text in one phase is used to determine the lexical variants of the message text that will be created and tested in a next phase.

4. The method of claim 1, wherein the lexical variants of the message text are created and tested in accordance with a supervised learning method to identify the independent variable word or word phrase combinations that maximize response rate.

5. The method of claim 1, wherein regression analysis is applied to the measured response rate for each of the tested lexical variants of the message text to identify the best performing independent variable words or word phrases.

6. The method of claim 5, wherein the lexical variants are categorized into families of words or word phrases having equivalent meaning or effect.

7. The method of claim 6, further comprising:
   in response to receiving a positive response rate for a lexical variant of the message text with a particular independent variable word or word phrase, testing other words or word phases for the independent variable that are within the same family as the word or word phrase of the particular independent variable associated with the positive response rate; and
   in response to receiving a negative response rate for a lexical variant of the message text with a particular independent variable word or word phrase, testing other words or word phases for the independent variable that are in a different family as the word or word phrase of the particular independent variable associated with the negative response rate.

8. The method of claim 1, wherein rules for manipulating the message vector are substantially in the form of a context-free grammar.

9. A non-transitory computer-readable medium comprising computer program code that, when executed by a communications system including a communications server in communication with one or more communications devices, enables the communications system to perform the following method for optimizing a message text:
   receiving on a communications server a message text comprising a plurality of words or word phrases that combine together as non-overlapping parts of the message text;
   treating the non-overlapping words or word phrases of the message text as multiple independent variables that are reduced to a message vector having each of the multiple independent variables as components of the message vector;
   automatically creating on the communications server a plurality of lexical variants of the message text, wherein the lexical variants are created by replacing a word or word phrase for each of the multiple independent variables with one or more alternate words or word phrases based on one or more value-changing rules being applied to the received word or word phrase in the message text, the lexical variants for each of the multiple independent variables being reduced to a lexical vector such that the message vector is made up of variable-sized lexical vectors;

selecting a subset from the plurality of created lexical variants of the message text based on an optimal experimental design;

sending each of the subset of created lexical variants of the message text to the one or more communications devices;

measuring a response rate for each sent lexical variant of the message text;

identifying one or more lexical variants having the best performing measured response rates for each of the lexical vectors;

automatically creating on the communications server syntactical variants of the identified best performing lexical variants by rearranging the lexical vectors within the message vector based on one or more position-changing rules;

sending a plurality of the syntactical variants of the identified best performing lexical variants to the one or more communications devices, wherein only grammatically-correct syntactical variants are sent;

measuring a response rate for each of the sent syntactical variants; and identifying a message text having the highest measured response rate for the sent syntactical variants.

10. The non-transitory computer-readable medium of claim 9, wherein the optimal experimental design used to select a subset from the plurality of created lexical variants of the message text is a D-optimal design.

11. The non-transitory computer-readable medium of claim 9, wherein the lexical variants of the message text are created and tested in a plurality of phases, wherein the performance of lexical variants of the message text in one phase is used to determine the lexical variants of the message text that will be created and tested in a next phase.

12. The non-transitory computer-readable medium of claim 11, wherein the lexical variants are categorized into families of words or word phrases having equivalent meaning or effect.

13. The non-transitory computer-readable medium of claim 12, further comprising:
in response to receiving a positive response rate for a lexical variant of the message text with a particular independent variable word or word phrase, testing other words or word phrases for the independent variable that are within the same family as the word or word phrase of the particular independent variable associated with the positive response rate; and
in response to receiving a negative response rate for a lexical variant of the message text with a particular independent variable word or word phrase, testing other words or word phrases for the independent variable that are in a different family as the word or word phrase of the particular independent variable associated with the negative response rate.

14. The non-transitory computer-readable medium of claim 9, wherein the lexical variants of the message text are created and tested in accordance with a supervised learning method to identify the independent variable word or word phrase combinations that maximize response rate.

15. The non-transitory computer-readable medium of claim 9, wherein regression analysis is applied to the measured response rate for each of the tested lexical variants of the message text to identify the best performing independent variable words or word phrases.

16. The non-transitory computer-readable medium of claim 9, wherein rules for manipulating the message vector are substantially in the form of a context-free grammar.

17. A communications system including a communications server in communication with one or more communications devices for automatically optimizing a message text, the communications system comprising:
a processor;
a memory coupled to the processor, wherein the memory stores instructions that, when executed by the processor, causes the communications system to perform the operations of:
receiving on the communications server a message text comprising a plurality of words or word phrases that combine together as non-overlapping parts of the message text;
treating the non-overlapping words or word phrases of the message text as multiple independent variables that are reduced to a message vector having each of the multiple independent variables as components of the message vector;
automatically creating on the communications server a plurality of lexical variants of the message text, wherein the lexical variants are created by replacing a word or word phrase for each of the multiple independent variables with one or more alternate words or word phrases based on one or more value-changing rules being applied to the received word or word phrase in the message text, the lexical variants for each of the multiple independent variables being reduced to a lexical vector such that the message vector is made up of variable-sized lexical vectors;
selecting a subset from the plurality of created lexical variants of the message text based on an optimal experimental design;
sending each of the subset of created lexical variants of the message text to the one or more communications devices;
measuring a response rate for each sent lexical variant of the message text;
identifying one or more lexical variants having the best performing measured response rates for each of the lexical vectors;
automatically creating on the communications server syntactical variants of the identified best performing lexical variants by rearranging the lexical vectors within the message vector based on one or more position-changing rules;
sending a plurality of the syntactical variants of the identified best performing lexical variants to the one or more communications devices, wherein only grammatically-correct syntactical variants are sent;
measuring a response rate for each of the sent syntactical variants; and
identifying a message text having the highest measured response rate for the sent syntactical variants.

* * * * *